July 7, 1964

A. H. GILLMER 3,140,486

DOPPLER RADAR DETECTION SYSTEM

Filed Oct. 30, 1958

INVENTOR
ARNOLD H. GILLMER,
BY
Walter J. Adam
ATTORNEY

INVENTOR.
ARNOLD H. GILLMER,
BY
Walter J. Adam
ATTORNEY

July 7, 1964          A. H. GILLMER          3,140,486

DOPPLER RADAR DETECTION SYSTEM

Filed Oct. 30, 1958          4 Sheets-Sheet 4

INVENTOR.
ARNOLD H. GILLMER.
BY
Walter J. Adam
ATTORNEY.

United States Patent Office 3,140,486
Patented July 7, 1964

3,140,486
DOPPLER RADAR DETECTION SYSTEM
Arnold H. Gillmer, Inglewood, Calif., assignor to Hughes Aircraft Company, Culver City, Calif., a corporation of Delaware
Filed Oct. 30, 1958, Ser. No. 771,707
12 Claims. (Cl. 343—8)

This invention relates to radar systems and particularly to a doppler radar detection system which acts in an improved manner to eliminate the undesirable effects of clutter signals.

As well known in the art, doppler radar receiver systems must process target echo signals which include undesired signals such as main lobe clutter caused by the antenna main lobe beam striking the ground and side lobe clutter caused by side lobe beams of the antenna striking the ground. The target echo signal must be distinguished from these undesired signals and the undesired signals must be prevented from passing through the detection system in order to provide reliable operation. Side lobe clutter signals when passed through the detectors may cause noise signals to appear as a white area on the screen of the indicator, for example, thus causing reading of the position of the signal derived from the echo signal to be difficult. Also, main lobe clutter signals may be of such amplitude to make differentiation from the echo signals unreliable and erroneous.

In the prior art systems, a target signal after being passed through the doppler filters is detected when it exceeds same preset bias which is above a predetermined threshold as determined by the level of the side lobe clutter signals. However, this system may provide unreliable operation since the threshold level varies, as with altitude under different conditions of operation. Also the threshold level must be varied for the detectors when operating in the different regions of the spectrum of the signal such as between the clutter free regions and side lobe clutter regions, thus increasing the complexity of the system. Some schemes are utilized to vary the detection threshold level of side lobe clutter signals with altitude for example, but these systems require a plurality of components and circuitry. Main lobe clutter signals may be suppressed by a servo controlled clutter rejection loop and a filter which acts to track the main lobe clutter signal in frequency. The servo system is required to maintain the main lobe clutter signal in the rejection notch of the filter since its frequency shift is dependent upon both the craft speed and the antenna look angles. This main lobe clutter rejection system has a disadvantage in that it requires a plurality of components to reliably track the main lobe clutter signal in frequency. Another disadvantage is the possible rejection of targets due to the clutter servo loop locking on and rejecting targets. Other undesired signals which are also present with target echo signals which are to be processed are altitude return signals caused by radiation from the antenna side lobes striking the ground beneath the craft and feed through signals of the signal from the transmitter to the receiver. However, these two latter undersired signals are easily removed by a rejection filter centered at a fixed frequency which is the frequency of the transmitter when converted to intermediate frequency.

Therefore, a detection system which would use a common characteristic of side lobe and main lobe clutter signals which would utilize a common system with a minimum of components and which would provide reliable and noise free detection would be very advantageous to the art.

It is therefore an object of this invention to provide a doppler radar detection system which removes undesired clutter signals with a minimum of components.

It is a further object of this invention to provide a doppler frequency detecting system which operates with a high degree of reliability to detect the presence of undesired signals thus providing a clear picture on the indicator.

It is a still further object of this invention to provide a clutter detection system which utilizes the spectral width of undesired signals so as to provide reliable detection of the target signal at all conditions of flight operation.

It is another object of this invention to provide a clutter rejection system which prevents both side lobe clutter and main lobe clutter signals from passing to the detector circuit while utilizing a common circuit for both operations to decrease the complexity of the system.

According to one feature of this invention, an improved clutter eliminating system is utilized with a conventional doppler radar velocity detection system including the conventional velocity filter banks having a plurality of filters with pass bands centered at a continual sequence of different frequencies and with each filter having associated rectifiers and threshold detectors coupled thereto. The substantially wide spectrum of the clutter signals relative to the spectral width of a target signal is utilized to detect the presence of clutter signals. A summing circuit is provided for each group of a predetermined plurality of the rectifiers, and is connected to each rectifier of that group for developing a combined signal in response to a direct current signal developed from a clutter signal and received simultaneously from all of the rectifiers of that group. Separate clutter threshold detector circuits are connected so as to respond to the combined signal from each different summing circuit to bias each of the threshold detectors of the respective group so as to render portions of them inactive for passing the direct current signal to an output lead. Thus the threshold detectors of the biased group or groups are prevented from passing direct current signals to output leads when a clutter signal passes through all of the filters of any group. Therefore, the spectral width of the clutter signals is utilized to prevent clutter and echo signals during the presence of a clutter signal from passing to an indicator for example, to thereby give a clear and noise free picture of the echo signal during the absence of clutter.

The novel features of this invention, as well as the invention itself, both as to its organization and method of operation, will best be understood from the accompanying description, taken in connection with the accompanying drawings, in which like reference characters refer to like parts, and in which.

Figure 1:
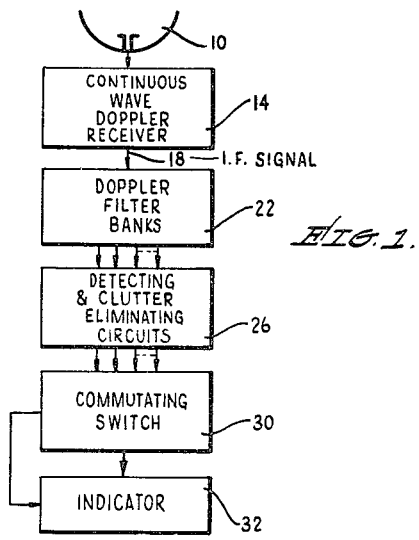
FIG. 1 is a block diagram of a detecting and clutter eliminating circuit in accordance with this invention, as utilized in a continuous wave doppler radar system.

Referring first to FIG. 1, a block diagram is shown of a detecting and clutter eliminating circuit in accordance with this invention as utilized in a continuous wave doppler radar system. A conventional antenna 10 which may be of an azimuth scan type for operation during the search mode is utilized to intercept an echo signal at radio frequency as transmitted to a target from a transmitter system (not shown) and reflected from the target to the antenna 10. A continuous wave (CW) doppler receiver 14 is connected to the antenna 10 for processing the target echo signal and any accompanying signals such as clutter signals as received at radio frequency. The receiver 14 may include a mixer circuit controlled by a local oscillator (not shown) for heterodyning the echo signal and accompanying signals at radio frequency to an intermediate frequency (IF) signal. The local oscillator may be controlled by a source of the transmitted frequency to form a coherent radar system. The receiver 14 may also include an amplifier (not shown) circuit for amplifying the IF signal. The IF signal is then passed on the lead 18 to a bank of doppler filter circuits 22 which are conventional narrow band doppler filters each having a pass band at a different frequency for determining the doppler frequency of the echo signals indicating target velocity, as is well known in the art. The target echo signal of the IF signal, which echo signal varies in frequency, passes through varying ones of the plurality of doppler filters when the frequency of the echo signal is within the pass band of each filter.

The detecting and clutter eliminating circuit 26 receives the IF signal passed through the filters of the filter bank 22 through a plurality of leads each connected to a separate filter. The output of the detecting and clutter eliminating circuit 26 which may be D.C. (direct current) signals are passed through a plurality of leads to a commutating switch 30 which is sometimes called a sampling switch. The outputs of the detecting and clutter eliminating circuit 26 are sampled in sequence by the action of the commutating switch 30 to provide an output signal which, relative to the sampling frequency, is indicative of doppler frequency or target velocity. The signal sampled by the commutating switch 30 is passed to an indicator 32 along with a reference signal indicating the scanning rate of the switch to form a signal on the screen for reading target velocity. The indicator 32, as is well known, may also include means (not shown) for receiving a reference signal from the antenna scan system to provide an azimuth coordinate to the screen of the indicator 32.

Figure 2:
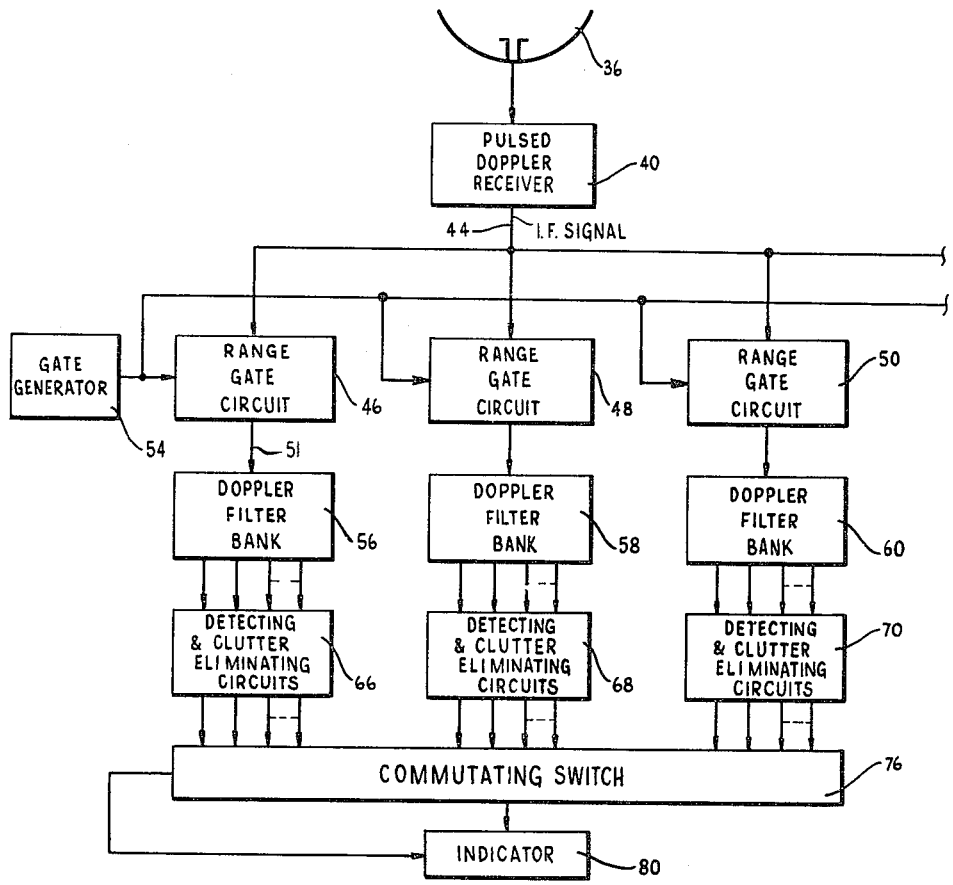
FIG. 2 is a block diagram of detecting and clutter eliminating circuits in accordance with this invention as utilized in a pulsed doppler radar system.

Referring now to FIG. 2, a block diagram is shown of detecting and clutter eliminating circuits in accordance with this invention utilized in a pulsed doppler radar system. An antenna 36, which may be similar to the antenna 10 of FIG. 1 is provided to intercept an echo signal and accompanying clutter signals, all at radio frequency, which are passed to a pulsed doppler receiver 40. The receiver 40 as discussed in relation to FIG. 1 may include a mixer and a local oscillator for heterodyning the radio frequency signal to an IF signal and may include an amplifier circuit for amplifying the IF signal and passing it to a lead 44. The IF signal on the lead 44 is then passed to a plurality of range gate circuits such as 46, 48 and 50 controlled by a gate generator circuit 54 which circuits are well known in the art. The range gate circuits 46, 48 and 50 act to divide the IF signal into time segments as determined by the relationship of the range interval to the pulse width. The range gates are utilized in pulsed doppler systems to obtain an advantage in the signal-to-noise ratio as is well known in the art. Each of the range gates 46, 48 and 50 is biased to pass the IF signal during different time segments of the listening interval of the receiver. Doppler filter banks 56, 58 and 60 are connected to the respective range gates 46, 48 and 50, each of the filter banks 56, 58, 60 having an identical range of frequencies as is well known in the art. Detecting and clutter eliminating circuits 66, 68 and 70 are connected respectively to the filter banks 56, 58 and 60 for receiving on separate leads the IF signals passed through the individual filter of each filter bank 56, 58, or 60 as discussed in relation to FIG. 1. The output signals from the detecting and clutter elimination circuits 66, 68 and 70 are passed to a commutating switch 76 which acts to sample D.C. signals in sequence from one filter bank to another, which switch is in turn connected to an indicator 80, similar to that discussed in relation to FIG. 1.

Figure 3:
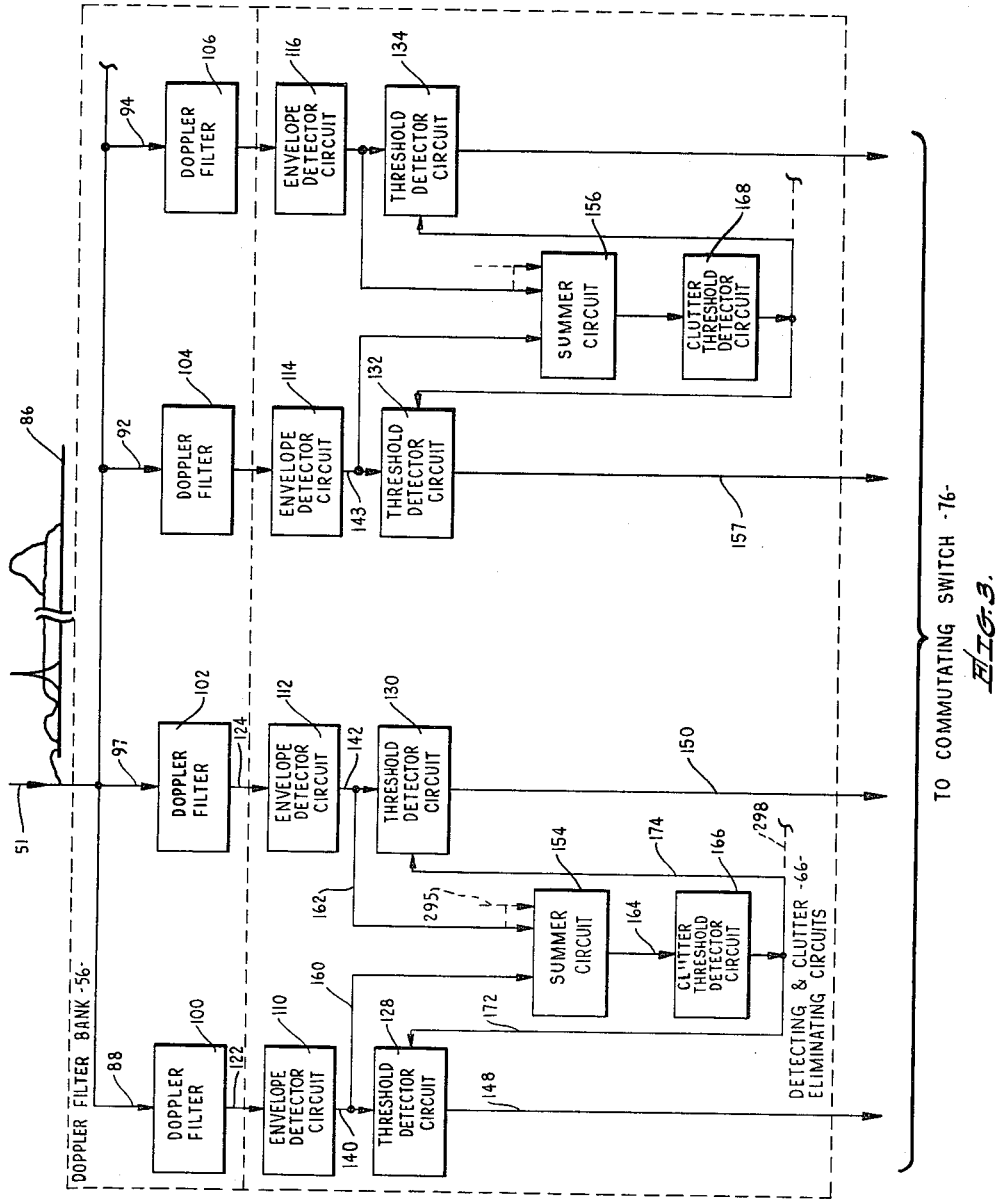
FIG. 3 is a block diagram of one of the doppler filter banks and one of the detecting and clutter eliminating circuits of FIGS. 1 and 2.

Referring now to FIG. 3, a block diagram is shown of the doppler filter bank 56 and the detecting and clutter eliminating circuit 66 of FIG. 2. It is to be noted that the filter bank 56 and the circuit 66 are similar to the filter banks 22, 58 and 60 and the detecting and clutter eliminating circuits 26, 68 and 70 of FIGS. 1 and 2. The IF signal received on the lead 51 is shown by a frequency versus amplitude diagram 86, which signal is passed simultaneously through leads 88, 97, 92 and 94 to doppler filters 100, 102, 104 and 106. It is to be noted that the filter bank 56 may include a plurality of other filters (not shown) as is well known in the art. It is to be also noted that the IF signal of the diagram 86 is simultaneously passed to other filter banks such as 58 and 60 of FIG. 2 when the circuits of this invention are utilized in conventional pulsed doppler radar systems. Envelope detectors 110, 112, 114, 116 are connected to each receive a portion of the intermediate frequency signal of the diagram 86 passed through respective filters 100, 102, 104, 106, the envelope detectors 110 and 112 being coupled to the filters 100 and 102 by leads 122 and 124. It is to be noted that the doppler filters may be divided into groups such as with filters 100 and 102 being included in one group and filters 104 and 106 being included in another group. Threshold detectors 128, 130, 132 and 134 are connected to respective ones of the envelope detectors 110, 112, 114 and 116, the threshold detectors 128, 130 and 132 being connected to the envelope detectors 110, 112 and 114 by the leads 140 and 142 and 143. As will be explained subsequently, the direct current signal derived from the echo signal is normally passed through the threshold detectors 128, 130, 132 and 134 to the commutating switch 76, the signals from the threshold detectors 128, 130 and 132 each being passed through a respective lead 148, 150 and 157.

Signal summation circuits such as summer circuits 154 and 156 are each connected to output leads of a respective group of envelope detectors such as the group including the envelope detectors 110 and 112 and the group including the envelope detectors 114 and 116. The lead 140 is connected to the summer 154 by a lead 160 and the lead 142 is connected to the summer 154 by a lead 162. It is to be noted that a greater number of the envelope detectors may be connected to the summer 154, as indicated by a phantom lead 295, as will be discussed subsequently. Clutter threshold detecting circuits 166 and 168 are connected to receive a combined output signal from the respective summers 154 and 156, the circuit 166 being connected to the summer 154 by a lead 164. The clutter threshold detecting circuit 166 is connected to pass a gating signal to the threshold detectors 128 and 130 and the clutter threshold detecting circuit 168 is connected to pass a gating signal to the threshold detectors 132 and 134. The clutter threshold detecting circuit 166 is connected to the threshold detectors 128 and 130 by respective leads 172 and 174. It is to be noted that the clutter threshold detectors such as detectors 166 may be connected to control other threshold detector circuits as indicated by a phantom lead 298, when the summer 154 receives input signals from a group of envelope detectors including more than the two envelope detectors 110 and 112.

Figure 4:
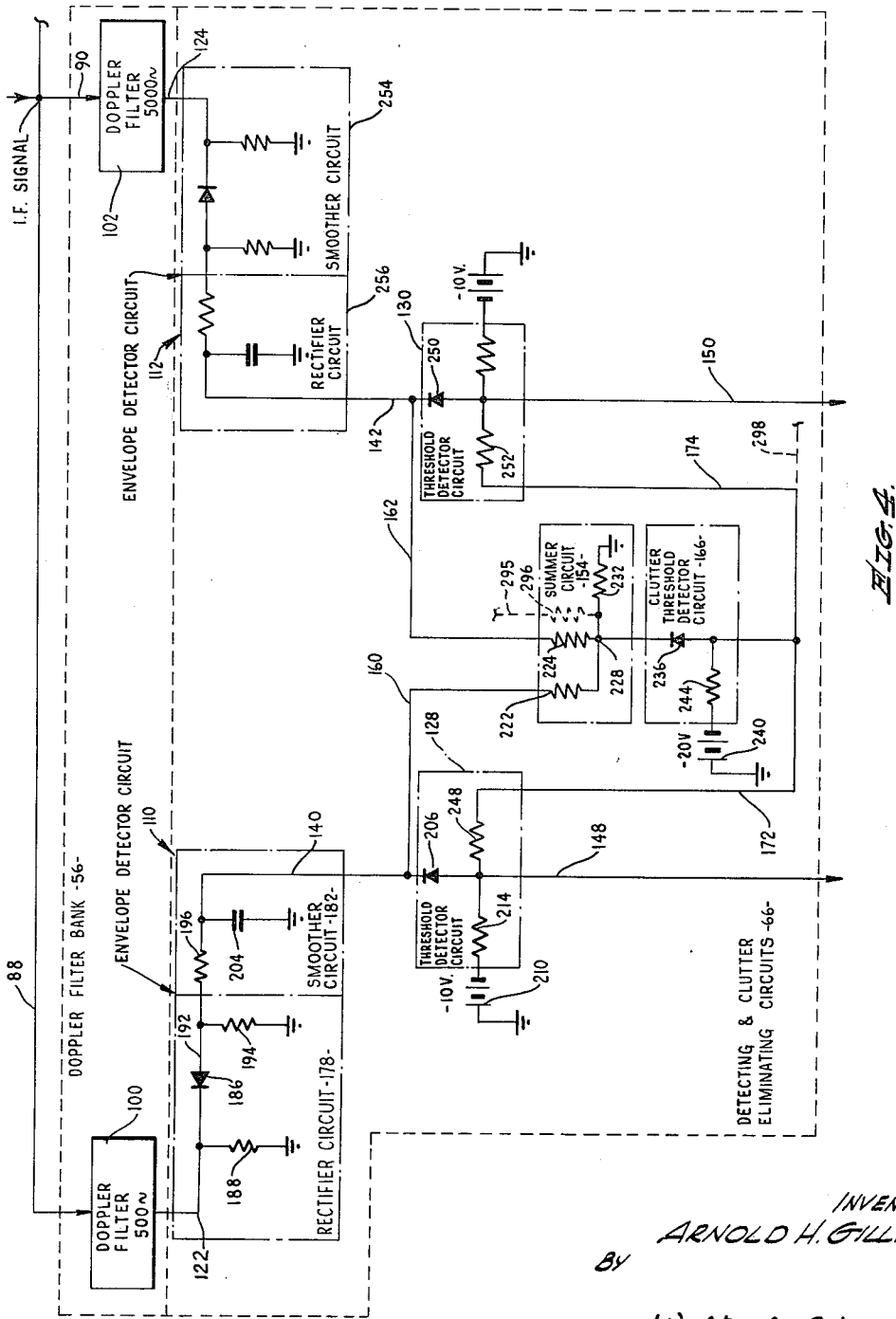
FIG. 4 is a schematic circuit diagram of one of the detecting and clutter eliminating circuits of FIG. 3.

Referring now to FIG. 4 a schematic diagram is shown of a portion of the detecting and clutter eliminating circuits 66 of FIG. 3. The doppler filters 100 and 102 which may each include 4 crystal lattice filters for developing a pass band of 500 cycles, pass the IF signal signal, which may have an interpulse period of 5 microseconds and is shown out of scale from the other waveforms of FIG. 6. It is to be noted that with a continuous wave doppler radar system as described in relation to FIG. 1, the IF signal would appear similar to the waveform 282 except as a continuous wave. The IF signal of the waveform 282 passes through one or a plurality of the doppler filters such as filters 100 and 102 to appear as a continuous wave as shown by a filter output signal of a waveform 284. This filter output signal may have a duration of 1/20 of a second as determined by the period that the azimuth scan of the antenna 36 of FIG. 2 is receiving echo signals from the target. It is to be noted that the doppler filter such as 100 and 102 and the smoother circuits 182 and 256 have characteristics such that the wave of the IF signal of the waveform 284 is continuous during the time of reception of signals from a target. Thus the doppler filters such as 100 and 102 are matched in time characteristics to the scan rate and the size of the target so that a continuous signal is passed through the filters during the period that signals are being received from the target, as is well known in the art.

The filter output signal of the wave form 284 passes through the rectifiers such as the rectifiers 178 and 254 to develop a negative D.C. signal as shown by a waveform 288. The D.C. signal of the waveform 288 is then passed through a smoother circuit such as the smoother circuits 182 and 256 to develop a D.C. signal as shown by a wave form 290, which D.C. signal may have a voltage level that varies from ground to —13 volts. The threshold detectors such as the detectors 128 and 130 are normally biased so that a negative D.C. signal (not shown) derived from the noise signal 266 of the diagram 86 will not pass therethrough to the output lead 148 or 149, as is well known in the art. However, the —13 volts of the D.C. signal of the waveform 290 biases the diode 206 and 250 into a conductive state and the direct current signal would pass to the output lines 148 and 150 and to the indicator 80 of FIG. 2, for example, except during times when the clutter detecting circuit is activated, as will be explained.

When the D.C. signal of the waveform 290 appears at a value of —13 volts on the leads 160 and 162 and is impressed on the summer 154, the potentials are combined in relation to the values of the resistors 232, 222 and 224. Thus the potential at the junction 228 falls from a —0 volt to a —21 volt level as shown by the summer output signal of a waveform 294. The 0 volt potential on the junction 228 is determined by the potential from the batery as a result of no clutter signals 264 or 270 or echo signal 260 passing through the filter 100 or 102. If the signals of the waveform 290 is received from only one envelope detector 110 on the lead 160 for example the potential at the junction 228 only falls to —10 volts for example. Thus a 0 volt level at the junction 228 resulting from the absence of clutter signals passing through the envelope detector at the junction 228, as well as a —10 volts at the junction 228 resulting from a clutter signal passing through one envelope detector such as 110, maintains the diode 236 biased out of conduction. When the —13 volt level of the D.C. signal of the waveform 290 appears simultaneously on the leads 160 and 162, the —21 volt level is impressed on the junction 228 as shown by the waveform 294 and the diode 236 is biased into conduction. Thus the —21 volts of the waveform 294 is impressed through the diode 236 onto the anodes of the diodes 206 and 250 biasing them out of conduction. Therefore, the —13 volt level of the D.C. signal of the wave form 290 is prevented from passing to the output leads 148 and 150 by the action of the summer 154 and the clutter threshold detector 66. It is to be noted that the D.C. signal of the diagram 290 may be developed by either the echo signals 260, the side lobe clutter signal 264 or the main lobe clutter signal 270. Also the summer 154 responds to develop the —21 volt level of the diagram 294 only when D.C. signals as shown by the diagram 290 appear on both of the leads 160 and 162. Therefore, the echo signal 260 when unaccompanied by clutter signals, for example the frequency of a spectral hole 279, passes through filters such as 100 or 102 to develop a D.C. signal on leads such as 140 or 142 and is passed to the output lead 148 or 149 without the threshold detectors 128 or 130 being gated to prevent the D.C. signal from passing therethrough. The echo signal 260 when at a frequency such as between the pass bands 274 and 276 so as to pass through two filters 100 and 102 simultaneously may not have sufficient power to develop a D.C. signal to bias the clutter threshold detector circuit 166 into operation, thus allowing the echo signal 260 to pass through the threshold detector circuits 128 and 130.

The circuit of FIG. 4 has been described with the summer circuit 154 responsive to a portion of the IF signal of the diagram 86 passing through two of the doppler filters such as filters 100 and 102. When utilizing this arrangement a signal passing through a group of any two filter pass bands such as pass bands 274 and 276 of FIG. 5 biases the respective two threshold detector circuits such as 128 and 130 out of conduction so that the D.C. signals of the waveform 290 are prevented from passing to the indicator, as for example, through each threshold detector 128 and 130 connected to that respective group of filters. Each group of filters 100 and 102 and group of filters 104 and 106 as shown by FIG. 3 is controlled with their associated envelope detectors and threshold detectors in a similar manner. Thus undesired clutter signals are presented from passing through either or both groups of two filters and appearing on the screen of the indicator, such as the indicator 80 of FIG. 2.

However, it is to be expressly understood that the summer circuit such as 154 and the clutter threshold detector circuits such as 166 may be connected to be responsive to IF signals of the diagram 86 passing through a group of any desired plurality of filters such as filters 100, 102 and 104 by varying the potential levels and the values of the resistors accordingly. For example, the summer 154 may have input leads such as 295 connected from the output lead 143 of a smoother circuit of an envelope detector 114 of FIG. 3 to junction 228 by way of a resistor such as 296. Thus, the summer output signal or combined signal of the waveform 294 falls to its desired lower voltage level to bias the diode 236 into conduction only when a D.C. signal appears on all three input leads 160, 162 and 295 resulting from an IF signal passing through a group of three respective filters such as 100, 102 and 104 (FIG. 3). The output lead of the clutter threshold detector circuit 166 is thus connected by a lead 298 to a third threshold detector circuit 132 (FIG. 3) for gating D.C. signals therethrough. When the IF signal of the diagram 86 passes through the pass band such as 274, 276 and 278 of the group of three filters 100, 102 and 104, the signal is gated so as to be prevented from passing to the output leads 148, 150 and 151. Each group of three doppler filters and associated clutter threshold detector circuits thus act in a similar manner to pass only the D.C. signal derived from the echo signal 260 when clutter signals are not passed through the filters of each group. In a similar manner, each group of filters may include four or any plurality of filters. It is to be also noted that each group may include the same number of filters to which the respective clutter threshold detecting circuit is responsive in a particular receiver system, or different groups of a single system may include different numbers fo filters to which the respective cluter threshold detecting circuits are responsive. Circuit considerations such as the relative width of the pass bands of the filters and the width of the side lobe clutter 264 and the main lobe clutter 270 may determined the number of filters which may be included in each group to be controlled by a common clutter threshold detecting circuit.

through the leads 122 and 124 to the respective envelope detectors 110 and 112 as discussed in relation to FIG. 3. The envelope detector 110 includes a rectifier circuit 178 and a signal smoother circuit 182. The rectifier circuit 178 includes a diode 186 with its cathode connected to the lead 122. A resistor 188 is connected between the lead 122 and ground for terminating the filter 100. The anode of the diode 186 is connected to a lead 192 which in turn is connected to ground by way of a resistor 194, which acts to bias the diode 186 for passing only the negative portion of the IF signal from the lead 122. The smoother circuit 182 which is a conventional integrating circuit includes a resistor 196 for passing the rectified signal from the diode 186 to one side of a capacitor 204, the other side of which is grounded. The direct current signal developed in the rectifier circuit 178 and the smoother circuit 182, as will be explained subsequently, is passed to the threshold detector circuit 128 by way of a lead 140, the threshold detecting circuit 128 including a diode 206 with its cathode connected to the lead 140 and its anode connected to the output lead 148.

The diode 206 is biased at a desired threshold level by a battery 210 having its positive terminal grounded and its negative terminal connected to the lead 148 by way of a current limiting resistor 214. The battery 210 may develop −10 volts at its output terminal. The rectifier circuit 256 and the smoother circuit 254 are similar to the rectifier circuit 178 and the smoother circuit 182 and need not be explained in detail.

The summer circuit 154 receives a direct current signal from the leads 140 and 142 through the leads 160 and 162 as is described in more detail below. The summer 154 includes resistors 222 and 224 connected from the respective leads 160 and 162 to the junction 228 which in turn is grounded by way of a summing resistor 232. It is to be noted that additional resistors such as resistor 296 shown in phantom line may be utilized for the summer circuit when more than two filters are controlled in each group, as will be explained subsequently. The clutter threshold detector circuit 166 includes a diode 236 having its cathode connected to the junction 228 by the lead 164 and having its anode biased by a battery 240 which has its positive terminal grounded and its negative terminal connected to the anode of the diode 236 by way of a current limiting resistor 244. The battery 240 may develop −20 volts at its output terminal. The clutter threshold detecting circuit 166 may respond to the combined signal from the junction 228 to pass a gating signal on the leads 172 and 174 to the threshold detectors 128 and 130. The lead 172 is connected to the anode of the diode 206 by way of a resistor 248 and the lead 174 is connected to the anode of a diode 250 of the threshold detecting circuit 130 by way of a resistor 252. It is to be noted that the threshold detecting circuit 130 is similar to the threshold detector circuit 128 and will not be explained in detail. The signal derived from the clutter threshold detector circuit 166 may also pass on a lead 298 shown as a phantom line when the group of filters controlled by the summer 154 includes a greater number of filters than the filters 100 and 102.

Figure 5:
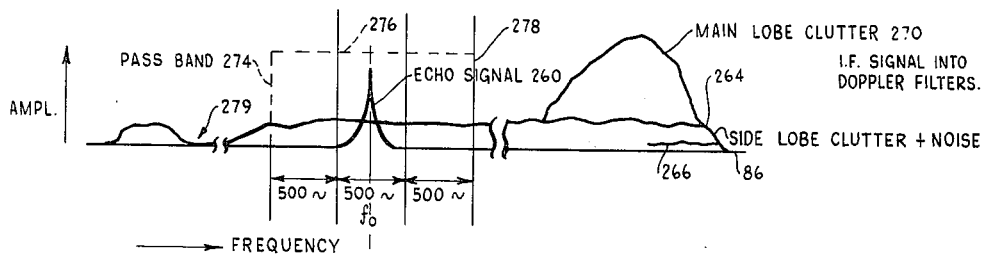
FIG. 5 is a graph showing frequency versus amplitude for signals occurring within the system, for explaining the operation of the clutter eliminating system of FIGS. 1 through 4.

Referring now to FIG. 5, which shows a diagram of frequency versus amplitude of the IF signal as well as referring to FIGS. 3 and 4, the operation of the circuit will be explained in further detail. The IF signal of the diagram 86 is received periodically and each signal passes simultaneously to the doppler filters 100 and 102 for example, which pass a portion of this signal therethrough. The IF signal of the diagram 86 includes an echo signal 260 received from a moving target, which signal may have a narrow spectral width of approximately 50 cycles. The echo signal 260 may be to the left of a frequency $f_0$, which is the frequency of the transmitter after being heterodyned to IF, for a target which is pulling or moving away from the receiver and may be to the right of the frequency $f_0$ for a target which is closing or moving toward the receiver. The IF signal of the diagram 86 may also include a side lobe clutter signal 264 having a relatively wide spectral width which may be approximately 50 kilocycles, and which also includes a receiver noise component 266. The clutter signal 264 may have a lesser amplitude than the echo signal 260. It is to be noted that the side lobe clutter signal 264 may be discontinuous and have spectral holes 279 along its spectral width. The IF signal also includes a main lobe clutter signal 270 which also has a spectral width substantially wider than the echo signal 260 which may be approximately 5 kilocycles. The main lobe clutter signal 270 may have an amplitude which is greater or is similar to that of the echo signal 260. Note that the IF signal of the diagram 86 shows only the first harmonic of the IF signal since all side band signals of higher harmonics are filtered out in the receiver 40 of FIG. 2 for example.

The doppler filters such as 100 and 102 may have a pass band having a width of 500 cycles as shown by a pass band 274, 276 and 278. Each of the filters such as 100 and 102 has a pass band centered at a different frequency such as the pass bands 274, 276 or 278 so that each of a plurality of portions of the IF signal of the diagram 86 passes through one of the filters of the filter bank 56 (FIG. 2). As is well known, the target echo signal 260 varies in doppler frequency with the velocity of the target, thus passing through different filters such as 100 or 102 as the frequency changes from one pass band to another to give a determination of doppler frequency, which frequency is proportional to the target velocity relative to the receiver.

The side lobe clutter signal 264 and the main lobe clutter signal 270 are variable in their time of occurrence and are variable in the frequency at which they are received, which frequency is determined by the configuration of the earth's surface for example. Also, in some regions the spectrum may be free of clutter signals as is well known in the art. During a scan of the target the side lobe clutter signal 264 may occur only at certain frequencies providing spectral holes 279 through which the echo signal 260 may pass, as will be explained subsequently. In certain types of radar searching systems sufficient echo signals such as 260 are passed clutter free through the circuits of this invention to detect the target.

In other types of searching where it is desired to receive the echo signal 260 in the presence of side lobe clutter 264, the threshold detectors such as 128 and 130 may have a threshold level for eliminating side lobe clutter in a conventional manner, as discussed. In this type of radar, the clutter detecting system of this invention is utilized as an improved and simplified main lobe clutter detection system being biased only to respond to the main lobe clutter signal 270, passing the echo signal 260 to activate the indicator 80 at all times except when appearing at the same frequency as the main lobe clutter signal 270. This utilization of this invention has an advantage of eliminating the conventional clutter servo loop. Thus the echo signal 260 may be accompanied with a side lobe clutter signal 264 at the same frequency range or it may be accompanied with the main lobe clutter signal 270 at the same frequency range. The circuit of this invention when utilized to overcome the undesired effects of both side lobe and main lobe clutter, acts to detect the presence of either the side lobe clutter signal 264 or the main lobe clutter signal 270 at any frequency at which it occurs and prevents all signals at that frequency from passing to the indicator 80 (FIG. 2), as will be explained subsequently.

Figure 6:
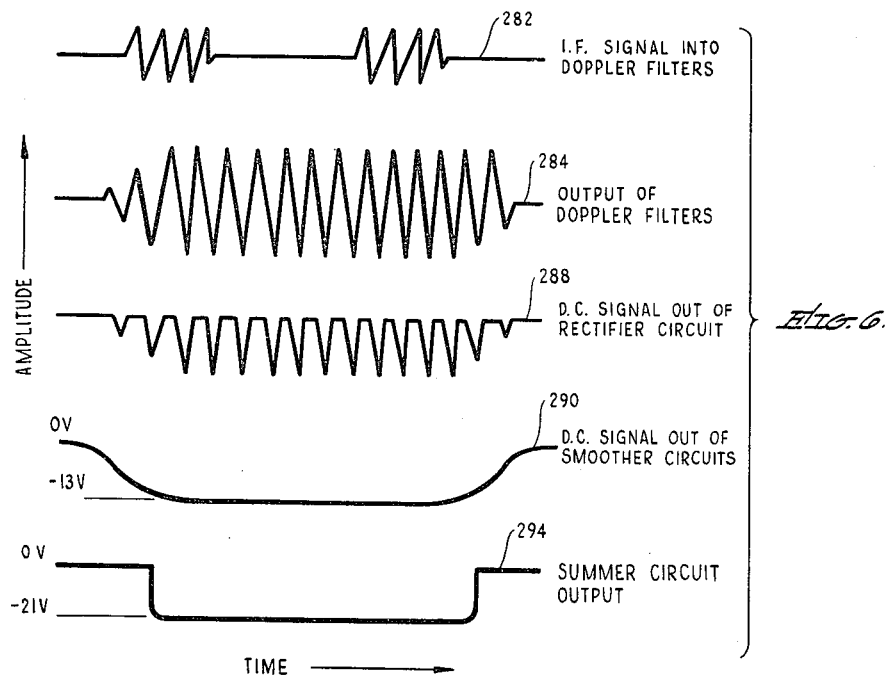
FIG. 6 is a graph of time versus amplitude, for signals occurring within the system, for further explaining the operation of the clutter eliminating system of FIGS. 1 through 4.

Referring now to FIG. 6 which is a diagram showing time versus amplitude of waveforms developed at various parts of the circuits of this invention as well as referring to FIGS. 4 and 5, the operation of this invention will be explained in still further detail. The IF signal on the lead 51 is shown by a diagram 282 as a pulsed doppler Thus there has been described a simplified and reliable clutter threshold detecting circuit which prevents the echo signal from appearing on the screen of the indicator when undesired clutter as determined by filters and a threshold bias voltage is present and which also prevents all clutter of the entire spectral band from appearing on the screen. Thus, since clutter signals are not consistently present at any one frequency, the clutter detecting system of this invention responds to the spectral width of the IF signals to provide an echo signal on the indicator which is capable of being easily and accurately read.

What is claimed is:

1. A circuit comprising a source of an input signal including a desired component of varying frequency with a substantially narrow spectral width and including at independently varying frequencies, an undesired component of a substantially wide spectral width, a plurality of filters each coupled to said source and each having a bandwidth substantially wide with respect to the spectral width of the desired component and substantially narrow with respect to the spectral width of said undesired component, each being centered at a different frequency for selectively passing the desired or undesired components of a portion of the band of the input signal, a plurality of separate detecting means each including a controllable gating element, and being coupled to a different one of said filters for developing a direct current signal in response to components of the passed portions of the input signal, a group of separate summing means each coupled to a selected group of said detecting means for combining the direct current signals therefrom, and clutter threshold detecting means coupled to each of said summing means for responding to the combined signal to develop a control signal when the direct current signal is developed in each detecting means of the group coupled thereto, and each of said clutter threshold detecting means coupled to said gating elements of the respective group of detecting means for applying said control signal to block said direct current signals developed by said respective group of detecting means from passing to said output.

2. A circuit comprising a source of input signals including a desired signal having a frequency varying along a spectral band and including an undesired signal appearing at varying positions of said spectral band and having a spectral width greater than that of said desired signal, a plurality of filters each having a bandwidth substantially wide with respect to the spectral width of said desired signal substantially narrow with respect to the spectral width of said undesired signal, each filter centered at different frequencies for passing said desired signal and portions of said undesired signal, detecting means coupled to each of said filters to develop output signals corresponding to the input signals passed thereto, and each including means for gating said respective output signal to separate terminals when operated, and separate summing means each coupled for responding to said input signals passing through a respective plurality of said filters to render inoperable said respective means for gating said output signals to said terminals.

3. A circuit comprising a source of a desired signal of varying frequency having associated therewith at times an undesired signal having a spectral width greater than that of said desired signal, a plurality of filters, each having a bandwidth for selectively passing said desired signal and being substantially narrow with respect to the spectral width of said undesired signal, said filters being centered at different frequencies for passing said desired signal and portions of said undesired signals, separate signal forming means coupled to each of said filters for responding to said signals passed thereto to develop an output signal and each including gating means controllable for passing said output signal to a terminal, and separate clutter eliminating means each coupled for responding to said signals passing through a respective group, each group including a different plurality of said filters, to control said gating means at said signal forming means coupled thereto so as to prevent said respective output signals from passing to the terminals.

4. A circuit for processing an input signal of varying frequency including a desired and an undesired component having similar frequencies at times, with said desired component having a substantially narrow spectrum and said undesired component having a substantially wide spectrum, comprising a plurality of filters each having a spectral band centered at a different frequency for passing a portion of said input signal the spectral band of each having a width for passing said desired component and a width substantially less than the width of said undesired component, separate signal forming means coupled to each of said filters for responding to a portion of said input signal passed through the respective filter for developing a direct current signal, each of said means including a gating portion to controllably pass said direct current signal to an output, and separate signal summing means each coupled to a different plurality of said signal forming means and to the respective gating portion, each responsive to said direct current signals developed by said different plurality of said signal forming means for providing a signal to bias said gating portions of said respective plurality of signal forming means to prevent said direct current signals from passing to said output from said respective plurality of signal forming means.

5. A radar circuit for responding to the varying frequency of an echo signal accompanied at times with an undesired clutter signal having a substantially wide spectral band relative to that of said echo signal, comprising a plurality of filters each having a pass band centered at a different frequency with each of said pass bands being of a width for selectively passing said echo signal and being substantially narrow relative to said spectral band of said clutter signal for passing a portion of said clutter signal, separate signal detecting means each coupled to respond to either said echo signals or to said portion of said clutter signals passed through a different one of said filters for developing a direct current signal, said means including gating means for passing said direct current signal when operative, and separate clutter detecting means each coupled for responding to said portions of said clutter signal passing through a different predetermined group of said filters for rendering said gating means of the respective group of said signal detecting means coupled thereto inoperative to prevent said respective direct current signals developed in response to said echo signal or said clutter signal from passing to the respective outputs.

6. A circuit comprising a source of an input signal having a predetermined spectrum including a target signal of varying frequency with a substantially narrow spectral width and including at varying frequencies of said spectrum relative to that of said target signal, an undesired clutter signal of substantially wide spectral width, comprising a plurality of filters each having a pass band centered at a different frequency for dividing the spectrum of said input signal into spectral bands for selectively passing the target signal and having a width substantially narrower than said undesired clutter signal, each spectral band separately passing a portion of said input signal, separate rectifying means coupled to each filter for responding to said portion of said input signal passed through said filter to develop a direct current signal, separate detecting means coupled to each of said rectifying means and including gating means for passing said direct current signals to an output terminal when operative, separate summing means each responsive to said portions of said input signal passing through a predetermined group of said filters to develop a combined signal, and separate clutter detecting means coupled to each summing means for responding to the combined signal therefrom to bias the group of said gating means coupled to said respective group of filters to which said summing means is responsive for rendering them inoperative to thereby prevent said respective direct current signals from passing to said output terminal.

7. A doppler radar circuit comprising a source of an intermediate frequency signal having a predetermined spectrum including a target signal of varying frequency and including at times with a frequency coincident to that of said target signal, a clutter signal having a substantially wide spectrum relative to that of said target signal, a plurality of doppler filters arranged in groups, each filter having a pass band centered at a different frequency of said predetermined spectrum for passing a portion of said intermediate frequency signal, said passband of each filter having a width for selectively passing said target signal and having a width substantially narrow relative to the spectrum of said clutter signal groups of rectifying means, each of said rectifying means coupled to one of said filters for responding to said portion of said intermediate frequency signal passed through the respective filter to develop a direct current signal, groups of detecting means, each detecting means coupled to one of said rectifying means and including biasing means for controlling the passing of said direct current signals to an output, separate summing means each coupled to a different group of said rectifying means for responding to a direct current signal developed simultaneously by all rectifying means of said group to form a common signal, and separate clutter detecting means coupled to each of said summing means and to said group of detecting means coupled to said respective group of rectifying means for responding to said common signal to render said biasing means of said respective group of detecting means inoperative for passing said direct current signals to said outputs, thereby preventing a direct current signal developed from portions of said intermediate frequency signal from passing to said outputs at times when said clutter signal is present to pass through a respective group of filters.

8. A doppler radar processing circuit comprising a source of doppler signals having a predetermined spectral bandwidth including an echo signal of substantially narrow spectrum and including a clutter signal of substantially wide spectrum, said clutter signal and said echo signal being coincident in frequency of said spectral band at varying times, a plurality of doppler filters each having a band substantially narrow in relation to the spectrum of said clutter signal for passing a portion of said doppler signal, an envelope detector coupled to each of said filters for responding to said doppler signals passed therethrough to develop a direct current signal, separate gating means coupled to each of said envelope detectors for gating said direct current signals to output terminals, separate summing means each coupled to a different plurality of said envelope detectors for developing a combined signal in response to a direct current signal being developed by all of the plurality of detectors coupled thereto, and separate clutter threshold detectors coupled to each of said summing means for responding to said combined signal to gate said plurality of gating means coupled to said plurality of envelope detector being coupled to said respective summing means, so as to prevent said direct current signals developed by said respective plurality of envelope detectors from passing to said output terminals.

9. A radar circuit for determining doppler frequency, comprising a receiver for developing an intermediate frequency signal including an echo signal of varying doppler frequency and a clutter signal of varying frequencies and including a noise signal with said echo signal having a substantially narrow spectral width and said clutter signal and noise signal having a substantially wide spectral width, a plurality of filters each having a bandwidth for selectively passing said echo signal and substantially narrow with respect to said clutter signal and said noise signal, the bandwith of each of said filters centered at a different frequency for selectively passing a portion of said intermediate frequency signal, separate rectifier means coupled to each of said filters for developing a direct current signal in response to said portion of said intermediate frequency signal, separate threshold detector means coupled to each of said rectifier means for preventing a direct current signal developed from said noise signal from passing therethrough to an output terminal and including gating means for passing a direct current signal developed from an echo or clutter signal to said output terminal when operative, separate summing means each coupled to a predetermined plurality of said rectifier means for developing a combined signal when said direct current signals are received from all of said predetermined plurality of said rectifier means, and separate clutter threshold detecting means coupled to each of said summing means for responding to said combined signal to render inoperative said gating means of said plurality of threshold detecting means coupled to said respective plurality of rectifier means to prevent said direct current signals developed by said respective rectifier means from passing to said output terminal.

10. A doppler radar circuit for determining doppler frequency comprising a source of a radar signal including an echo signal of varying doppler frequency and including at independently varying frequencies, a clutter signal and a noise signal with said echo signal having a substantially narrow spectrum and said clutter signal and noise signal having a substantially wide spectrum, a plurality of doppler filters coupled to said source each having a bandwith for passing said echo signal and substantially narrow with respect to said clutter signal and said noise signal, the bandwidth of each of said filters centered at a different frequency for passing a portion of said intermediate frequency signal, separate rectifier means coupled to each of said filters for developing a direct current signal in response to a portion of said intermediate frequency, separate threshold detector means coupled to each of said rectifier means for preventing a direct current signal developed from said noise signal from passing therethrough to an output terminal and including gating means controlling the passing to said output terminal of said direct current signals developed from said echo and clutter signals, separate summing means each coupled to a predetermined plurality of different ones of said rectifier means for developing a combined signal when said direct current signals developed from said echo signal or from said clutter signals are received from each of said respective plurality of rectifier means, and separate clutter threshold detecting means coupled to each of said summing means for responding to said respective combined signal to control said gating means of said respective plurality of threshold detecting means so as to prevent said direct current signals developed from said echo and clutter signals from passing to said output terminal.

11. A radar circuit for determining the doppler frequency of an echo signal having undesired clutter components associated therewith at times, said echo signal having a substantially narrow spectrum and said clutter components having a substantially wide spectrum, comprising a receiver for processing said echo signal, a plurality of range gates coupled for receiving said echo signal, a plurality of filters coupled to each range gate, each filter having a bandwidth for selectively passing said echo signal and substantially narrow relative to said clutter components, said bandwith of each filter centered at a different frequency for selectively passing said echo signal and for selectively passing a portion of said clutter component, separate means coupled to each of said filters for developing a direct current signal in response to said echo clutter signal passed through said filter, separate gating means coupled to each of said rectifier means for gating said direct current signals to output terminals, separate summing means each coupled to a predetermined plurality of different one of said rectifier means for developing a combined signal when said direct current signals are developed by all of said respective rectifier means, and separate clutter threshold detecting means coupled to each of said summing means for responding to said combined signal to gate said respective plurality of gating means so as to prevent said direct current signals from passing to said output terminals.

12. A circuit comprising a source of an input signal including a desired component of varying frequency with a substantially narrow spectral width and including at independently varying frequencies, an undesired component of substantially wide spectral width, a plurality of filters each coupled to said source and each having a bandwidth for selectively passing said desired component and substantially narrow with respect to the spectral width of the undesired component, each being centered at a different frequency for selectively passing a portion of the input signal, a separate envelope detector coupled to each of said filters for developing a direct current signal in response to the passed portion of said input signal, a first diode coupled to the output of each envelope detector, first biasing means coupled to each of said first diodes for normally biasing said diodes into conduction to pass said direct current signals to an output terminal, said means including an input for receiving a biasing signal to overcome the normal bias, separate summing means each coupled to a group of different ones of said envelope detectors for combining a portion of said direct current signals therefrom, a second diode coupled to the output of each of said summing means, separate second biasing means coupled to maintain each of said second diodes normally nonconductive and to be rendered conductive when said direct current signals are received from each of the envelope detectors of the group coupled to the respective summing means, to pass said combined signal from said summing means to each of said first diodes coupled to said respective group of envelope detectors for rendering said respective first diodes nonconductive, thereby blocking said direct current signals from said respective group of envelope detectors from passing to said output terminals.

References Cited in the file of this patent

UNITED STATES PATENTS

| | | |
|---|---|---|
| 1,968,460 | Llewellyn | July 31, 1934 |
| 2,786,997 | Chambers | Mar. 26, 1957 |